United States Patent
Kashyap

(10) Patent No.: US 10,832,154 B2
(45) Date of Patent: *Nov. 10, 2020

(54) PREDICTIVE CONTROLLER ADAPTING APPLICATION EXECUTION TO INFLUENCE USER PSYCHOLOGICAL STATE

(71) Applicant: Microsoft Technology Licensing, LLC, Redmond, WA (US)

(72) Inventor: Abhinav Kashyap, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/524,890

(22) Filed: Jul. 29, 2019

(65) Prior Publication Data
US 2019/0347566 A1     Nov. 14, 2019

Related U.S. Application Data

(63) Continuation of application No. 14/930,563, filed on Nov. 2, 2015, now Pat. No. 10,552,752.

(51) Int. Cl.
    G06N 7/00    (2006.01)
    G06N 20/00   (2019.01)

(52) U.S. Cl.
    CPC ............. G06N 7/005 (2013.01); G06N 20/00 (2019.01)

(58) Field of Classification Search
    None
    See application file for complete search history.

(56) References Cited

U.S. PATENT DOCUMENTS 6,292,688 B1 *   9/2001   Patton ................. A61B 5/16
                                                  600/544
7,099,855 B1 *   8/2006   Nelken ................ G06N 5/022
                                                  706/50

(Continued)

OTHER PUBLICATIONS

Conati, C. (2002). "Probabilistic assessment of user's emotions in educational games." Applied artificial intelligence 16.7-8 (2002): 555-575. (Year: 2002).*

(Continued)

*Primary Examiner* — Kamran Afshar
*Assistant Examiner* — Benjamin J Buss
(74) *Attorney, Agent, or Firm* — Ray Quinney & Nebeker P.C.; John O. Carpenter

(57) ABSTRACT

A "Predictive Controller" operates with any type of controller or user input device to predict user inputs or responses to a current state of an application. A predictive model of the current state of the application is applied to prior user inputs to jointly predict a current user-specific psychological state or profile of the user and a predicted next user response or input. The predicted response or input is provided as the user input to the particular application prior to receiving the actual user input, thereby reducing latency of the response of the application to that actual user input. In addition, a tangible feedback corresponding to the predicted next user input is provided. Further, the predictive capabilities of the Predictive Controller can be applied to locally or remotely hosted instances of the application to reduce latencies associated with user inputs received from any type of controller or user input device.

16 Claims, 6 Drawing Sheets

(56) References Cited

U.S. PATENT DOCUMENTS

| | | | | |
|---|---|---|---|---|
| 7,930,676 B1* | 4/2011 | Thomas | | G06F 9/44505 |
| | | | | 706/45 |
| 8,683,348 B1* | 3/2014 | Blank | | G06F 3/011 |
| | | | | 715/709 |
| 9,196,173 B2* | 11/2015 | Bak | | G06K 9/00 |
| 9,514,481 B2* | 12/2016 | Kumar | | G06Q 30/0269 |
| 9,817,949 B2* | 11/2017 | Poulin | | G06N 5/04 |
| 9,930,102 B1* | 3/2018 | Paulus | | G06Q 40/00 |
| 10,061,977 B1* | 8/2018 | Chang | | G06K 9/00308 |
| 2002/0198053 A1* | 12/2002 | Yamaoka | | A63F 9/00 |
| | | | | 463/42 |
| 2004/0243257 A1* | 12/2004 | Theimer | | H04M 1/72569 |
| | | | | 700/44 |
| 2007/0100251 A1* | 5/2007 | Prichep | | A61B 5/04009 |
| | | | | 600/544 |
| 2007/0265090 A1* | 11/2007 | Barsness | | A63F 13/12 |
| | | | | 463/42 |
| 2009/0099474 A1* | 4/2009 | Pineda | | A61B 5/121 |
| | | | | 600/545 |
| 2010/0197381 A1* | 8/2010 | Masuda | | A63F 13/10 |
| | | | | 463/23 |
| 2010/0221687 A1* | 9/2010 | Forbes | | G06K 9/00308 |
| | | | | 434/236 |
| 2011/0223571 A1* | 9/2011 | Farahat | | G06Q 30/02 |
| | | | | 434/236 |
| 2011/0248916 A1* | 10/2011 | Griffin | | G06F 3/016 |
| | | | | 345/157 |
| 2012/0135804 A1* | 5/2012 | Bender | | A61B 5/165 |
| | | | | 463/36 |
| 2012/0290508 A1* | 11/2012 | Bist | | G06N 5/04 |
| | | | | 706/10 |
| 2013/0030812 A1* | 1/2013 | Kim | | G10L 15/22 |
| | | | | 704/270 |
| 2013/0110895 A1* | 5/2013 | Valentino | | G09B 23/00 |
| | | | | 708/255 |
| 2013/0215116 A1* | 8/2013 | Siddique | | G06Q 30/0643 |
| | | | | 345/420 |
| 2013/0339283 A1* | 12/2013 | Grieves | | G06F 17/276 |
| | | | | 706/46 |
| 2014/0101296 A1* | 4/2014 | Li | | H04L 41/0813 |
| | | | | 709/221 |
| 2014/0108842 A1* | 4/2014 | Frank | | G06F 17/28 |
| | | | | 713/323 |
| 2014/0122383 A1* | 5/2014 | Shen | | A63F 13/12 |
| | | | | 706/12 |
| 2014/0142926 A1* | 5/2014 | Jones | | G06F 17/276 |
| | | | | 704/10 |
| 2014/0206323 A1* | 7/2014 | Scorcioni | | H04W 4/16 |
| | | | | 455/414.1 |
| 2014/0215396 A1* | 7/2014 | Danzinger | | G06F 3/041 |
| | | | | 715/816 |
| 2014/0278786 A1* | 9/2014 | Liu-Qiu-Yan | | G06Q 30/0201 |
| | | | | 705/7.32 |
| 2014/0323817 A1* | 10/2014 | el Kaliouby | | A61B 5/165 |
| | | | | 600/300 |
| 2014/0344270 A1* | 11/2014 | Lambert | | G06Q 10/067 |
| | | | | 707/737 |
| 2014/0359439 A1* | 12/2014 | Lyren | | G06F 3/011 |
| | | | | 715/705 |
| 2015/0017967 A1* | 1/2015 | Cao | | H04W 4/18 |
| | | | | 455/418 |
| 2015/0134572 A1* | 5/2015 | Forlines | | G06F 3/041 |
| | | | | 706/11 |
| 2015/0178624 A1* | 6/2015 | Chee | | G06K 9/6217 |
| | | | | 706/11 |
| 2015/0256634 A1* | 9/2015 | Bastide | | G06Q 50/01 |
| | | | | 709/204 |
| 2015/0256675 A1* | 9/2015 | Sri | | H04M 3/5183 |
| | | | | 379/265.09 |
| 2015/0332603 A1* | 11/2015 | Aravkin | | G09B 5/04 |
| | | | | 434/238 |
| 2015/0351680 A1* | 12/2015 | Gordon | | A61B 5/162 |
| | | | | 600/595 |
| 2016/0015307 A1* | 1/2016 | Kothuri | | A61B 5/167 |
| | | | | 702/19 |
| 2016/0042359 A1* | 2/2016 | Singh | | G06Q 30/016 |
| | | | | 704/2 |
| 2016/0042372 A1* | 2/2016 | Herman | | G06N 20/00 |
| | | | | 705/7.33 |
| 2016/0093154 A1* | 3/2016 | Bytnar | | G07F 17/3218 |
| | | | | 463/25 |
| 2016/0110647 A1* | 4/2016 | Krueger | | G06N 5/04 |
| | | | | 706/11 |
| 2016/0188112 A1* | 6/2016 | Forlines | | G06F 3/0416 |
| | | | | 345/173 |
| 2016/0248895 A1* | 8/2016 | Li | | H04L 51/32 |
| 2016/0256690 A1* | 9/2016 | Cecchi | | A61N 1/36132 |
| 2016/0259908 A1* | 9/2016 | Hong | | G06F 1/163 |
| 2016/0292535 A1* | 10/2016 | Thorn | | H04N 5/23219 |
| 2016/0300570 A1* | 10/2016 | Gustafson | | G10L 15/265 |
| 2017/0004408 A1* | 1/2017 | Edelen | | G06N 5/02 |
| 2017/0030726 A1* | 2/2017 | French | | G01C 21/3461 |
| 2017/0039495 A1* | 2/2017 | Takehara | | G06Q 50/10 |
| 2017/0109651 A1* | 4/2017 | Bruno | | G06F 17/241 |
| 2017/0200449 A1* | 7/2017 | Penilla | | H04L 67/12 |
| 2018/0330152 A1* | 11/2018 | Mittelstaedt | | G06K 9/00302 |

OTHER PUBLICATIONS

Persuasion Revolution (Archived Jun. 14, 2014). "380 High Emotion Words Guaranteed to Make you more Persuasive". www.thepersuasionrevolution.com/380-high-emotion-persuasive-words/ Archived by the Wayback Machine at archive.org on Jun. 14, 2014. Archive accessed Oct. 1, 2019. (Year: 2014).*

Shah. S. et al. (2015). "Towards affective touch interaction: predicting mobile user emotion from finger strokes". Journal of Interaction Science (2015) 3:6. DOI 10.1186/s40166-015-0013-z (Year: 2015).*

Callejas, Z. et al. (2011). "Predicting user mental states in spoken dialogue systems". EURASIP Journal on Advances in Signal Processing 2011, 2011:6. (Year: 2011).*

Nwe, T.L. et al. (2003). "Speech emotion recognition using hidden Markov models". Speech Communication 41 (2003) 603-623. DOI:10.1016/S0167-6393(03)00099-2 (Year: 2003).*

* cited by examiner

200 Underlying or Unobservable Markov Chain Representing Transitions between Predicted Psychological States a, p and c

210

Observable Markov Chain Representing Transitions between Predicted User Inputs X, Y and Z

*Exemplary Hidden Markov Model for Predicting User Inputs*

PREDICTIVE CONTROLLER ADAPTING APPLICATION EXECUTION TO INFLUENCE USER PSYCHOLOGICAL STATE

CROSS-REFERENCE TO RELATED APPLICATIONS

This application is a continuation of U.S. patent application Ser. No. 14/930,563, filed Nov. 2, 2015, which is hereby incorporated by reference in its entirety.

BACKGROUND

Typical controller devices allow users to interact with applications by providing user input to those applications in direct response to user inputs or interactions with the controller. The application then responds to that user input. Well-known examples of controllers include, but are not limited to, gamepads, paddles, joysticks, trackballs, throttles, steering wheels, yokes, pedals, keyboards, mouse-type devices, touchscreen devices, etc.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

A "Predictive Controller," as described herein, is operable with any type of hardware controller or user input device to predict the input or response of a particular user to a current state (e.g., a particular scene, set of circumstances, development, etc.) of a particular application that is either locally or remotely hosted for execution and then rendered, transmitted if remote, and displayed on one or more local display devices. In other words, whether the application is executed either locally or remotely, current application states are rendered, transmitted if remote, and then displayed on one or more display devices local to the user while the user interacts with those application states via a local hardware controller or other input device in communication with the application. For example, in various implementations, the Predictive Controller operates with a hardware controller device to receive a plurality of user inputs or responses for an application during execution of the application. The Predictive Controller further includes a set of trained predictive models corresponding to each of a plurality of possible execution states of the application.

When predicting user inputs, the Predictive Controller first determines the current execution state of the application. In various implementations, the Predictive Controller then applies the predictive model corresponding to the current execution state of the application to one or more prior user inputs to jointly predict a current psychological state of the user and a corresponding predicted next user input or response. In various implementations, the Predictive Controller then applies the predicted next user input or response to the application prior to receiving the actual user input or response. As a result, the Predictive Controller reduces latency of both locally and remotely hosted applications when responding to user inputs, regardless of the controller type being used to receive user inputs or responses. In various implementations, the Predictive Controller also initiates a tangible feedback or notification (e.g., visible or haptic feedback) corresponding to the predicted next user input whenever that predicted next user input is applied to the application or whenever that predicted next user input differs from the subsequently received actual user input.

For example, in various implementations, the Predictive Controller applies one or more existing hardware controller input databases (e.g., recorded real-world inputs or responses from large numbers of users) to train a predictive model such as a Hidden Markov Model (HMM) or any other machine-learned model. In the case of an HMM, in various implementations the real-world user inputs or responses, which are directly observable as inputs to application, are modeled as an observable Markov chain for each possible application state. Further, in the case of an HMM, the user's predicted psychological state is modeled as an unobservable (or underlying) Markov chain. In this type of HMM-based model, the two Markov chains have deep interactions, with the unobservable Markov chain (e.g., modeled user psychological state transitions) affecting the observable Markov chain and hence the resulting predicted next user input or response to the application.

The Predictive Controller described herein provides various techniques for predicting the input or response of a particular user to a current state of a particular application prior to receiving actual user inputs or responses so as to reduce latency of application responses to user inputs or responses. In addition to the benefits described above, other advantages of the Predictive Controller will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
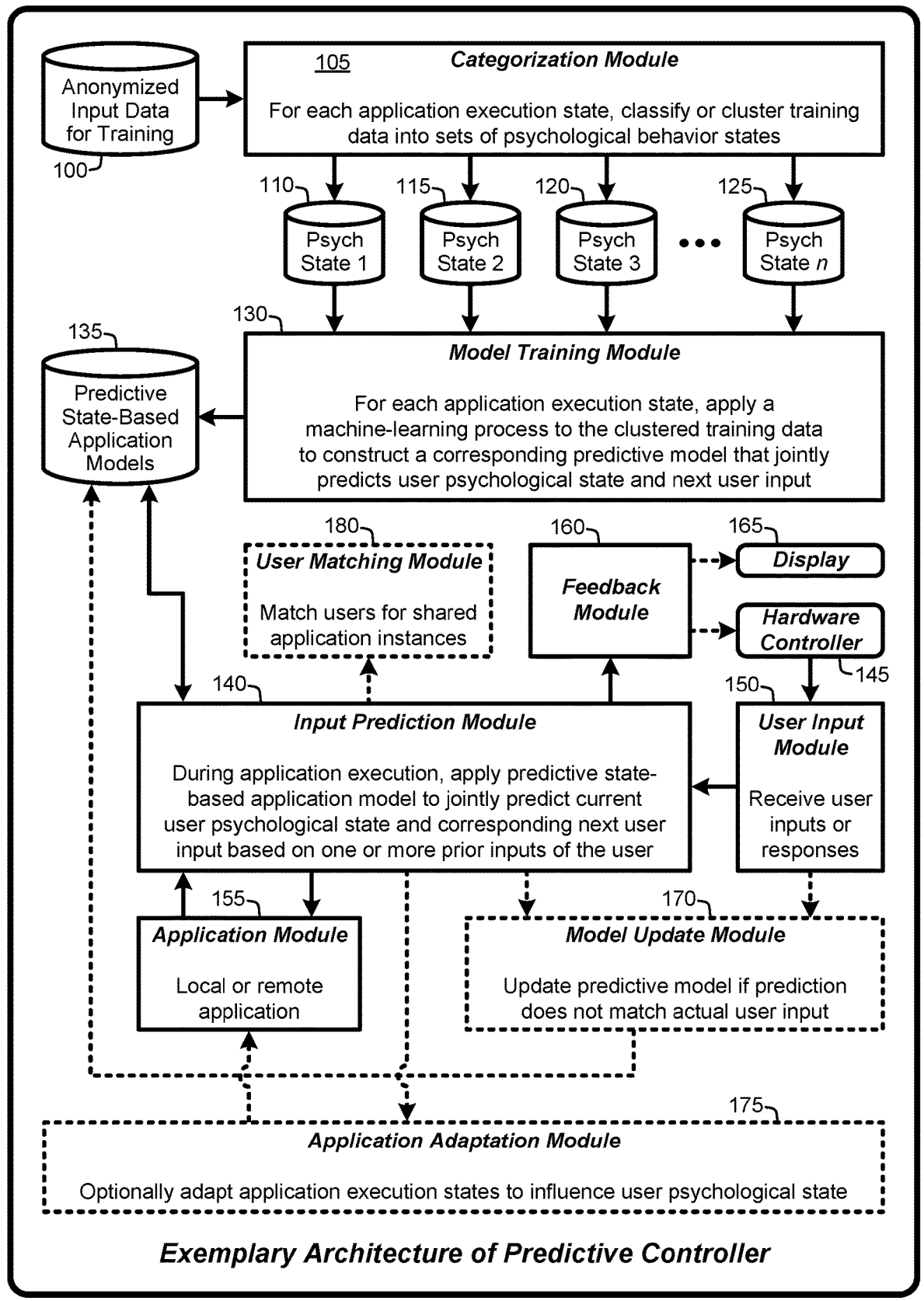
FIG. 1 provides an exemplary architectural flow diagram that illustrates program modules for instantiating various implementations of a "Predictive Controller," as described herein.

In the following description of various implementations of a "Predictive Controller," reference is made to the accompanying drawings, which form a part hereof, and in which is shown by way of illustration specific implementations in which the Predictive Controller may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Predictive Controller. Further, the appearance of such phrases throughout the specification are not necessarily all referring to the same implementation, and separate or alternative implementations are not mutually exclusive of other implementations. The order described or illustrated herein for any process flows representing one or more implementations of the Predictive Controller does not inherently indicate any requirement for the processes to be implemented in the order described or illustrated, and any such order described or illustrated herein for any process flows do not imply any limitations of the Predictive Controller.

As utilized herein, the terms "component," "system," "client," "host," "server," and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the Predictive Controller, any of a plurality of networked servers may concurrently or separately act as either or both client computing devices and host computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In situations where an application is remote or cloud-based relative to a local user, inherent latency exists both in providing the user input to the application and in providing the corresponding response of the application back to the user. In other words, where an application is remotely hosted (e.g., a remote or cloud-based application scenario), the application is executed on a remote server or cloud-based system. Resulting application states are then rendered and transmitted to one or more display devices local to the user. User input via one or more local hardware controller devices is then registered, transmitted to the remote application and responded to by the application with some inherent delay based on networking round-trip times between the locations of the user and the application. Consequently, where applications are intended or expected to respond in near real-time to user inputs, remote or cloud-based applications tend to exhibit noticeable lag in responding to those user inputs. Similar, though reduced, latencies may exist even in cases where the application is executing on a computing device local to the user.

In various implementations, the Predictive Controller applies a machine-learned predictive model to predict the input or response of a particular user to a current state of a particular application prior to receiving actual user inputs or responses so as to reduce latency of application responses to user inputs or responses received via a hardware controller device. In general, the current state of the application is defined as a particular scene, set of circumstances, development, input case, etc., of the application that progresses or changes in response to user input. Typically, larger performance improvements in terms of latency reduction are observed when applying the Predictive Controller to remotely hosted applications, where delay or latency results from the round-trip time for communications between the user and the remotely hosted application. However, the Predictive Controller can also be applied to locally hosted instances of the particular application to further reduce the already relatively small latencies associated with user inputs or responses received from any type of controller or user input device.

Examples of applications operable with the Predictive Controller include, but are not limited to, simulation applications, virtual reality applications, augmented reality applications, training applications, physical security and monitoring applications, etc., or any other application in which real-time inputs or responses by the user are intended to interact with or drive a response to the current state of the application.

Examples of hardware controllers or user input devices operable with the Predictive Controller include, but are not limited to, gamepads, paddles, joysticks, trackballs, throttles, steering wheels, yokes, pedals, handheld controllers, mice or other pointing devices, gesture tracking devices, eye-tracking devices, body tracking devices, user held or worn inertial sensors and input devices, user worn electromyography (EMG) based controllers, touchscreens, touch-sensitive surfaces, keyboards, audio input devices, voice or speech-based input and control devices, video input devices, haptic input devices, etc., or any combination of such devices. For purposes of explanation and discussion, all of these types of controllers, whether wired or wireless, are simply referred to herein as "hardware controllers."

1.1 System Overview:

As mentioned above, the Predictive Controller provides various techniques for predicting the input or response of a particular user to a current state of a particular application prior to receiving actual user inputs so as to reduce latency of application responses to user inputs. The processes summarized above are illustrated by the architectural flow diagram of FIG. 1.

In particular, FIG. 1 illustrates interrelationships between program modules for effecting various implementations of the Predictive Controller, as described herein. Furthermore, while the diagram of FIG. 1 illustrates a high-level view of various implementations of the Facet Recommender, FIG. 1 is not intended to provide an exhaustive or complete illustration of every possible implementation of the Predictive Controller as described throughout this document. In addition, it should be noted that any boxes and interconnections between boxes that may be represented by broken or dashed lines in FIG. 1 represent alternate implementations of the Facet Recommender described herein, and that any or all of these alternate implementations, as described below, may be used in combination with other alternate implementations that are described throughout this document.

For example, as illustrated by FIG. 1, in various implementations, model training begins by receiving a large amount of real-world training data, e.g., anonymized input data 100. In general, this real-world training data comprises actual hardware controller inputs (including sequences and combinations of multiple inputs over time) from large numbers of users in response to one or more locally or remotely hosted instances of the particular application or similar applications. Further, in various implementations, this real-world training data is anonymized to protect user privacy.

In various implementations, for each application execution state, the Predictive Controller applies a categorization module 105 to classify or cluster the corresponding real-world training data into a plurality of possible psychological states. Examples of possible psychological states include, but are not limited to, aggressive, passive, cooperative, deep thought, happy, fearful, bored, interested, etc. The result of this categorization process is multiple sets of training inputs tied to particular psychological states for each corresponding application state (e.g., Psych State 1 through n, 110, 115, 120, 125). The clustered training data (110, 115, 120, 125) is then provided to a model training module 130.

In general, for each application execution state, the module training module 130 applies a machine-learning process (see Section 2.2) to the clustered training data (110, 115, 120, 125) to construct corresponding predictive state-based application models 135. These predictive state-based application models 135 are then applied to jointly predict user psychological state and next user inputs. In particular, during application execution (e.g., application module 155), an input prediction module 140 applies the predictive state-based application models 135 to jointly predict the current user psychological state and the corresponding next user input based on current and prior predicted user psychological states and one or more prior inputs of the user received from a hardware controller 145 via a user input module 150. The input prediction module 140 then provides the predicted next user input to the application module 155 as the user input to which the application responds.

Further, in various implementations, the Predictive Controller also applies a feedback module 160 to initiate a visible and or physically tangible feedback or notification corresponding to the predicted next user input whenever that predicted next user input is applied to the application and/or whenever that predicted next user input differs from a subsequently entered received actual user input. Such alerts may be provided via either or both the hardware controller 145 and a display 165. The display 165 is defined as any video output device, including, but not limited to 2D and 3D display devices such as monitors, televisions, projectors, etc., and to either or both augmented reality and virtual reality display devices.

In various implementations, a model update module 170 is applied to update corresponding predictive state-based application models whenever the predicted user input differs from the subsequently entered actual user input. In particular, if the predicted user input does not match the actual user input, the model update module 170 uses the actual user inputs as new training examples by applying additional machine-learning techniques to adapt or adjust the corresponding predictive state-based application model 135. In various implementations, these updates are performed on a per-user basis so that the predictive state-based application models 135 associated with a particular user provide increasingly accurate prediction results over time for the particular user.

In related implementations, global versions of the predictive state-based application models 135 are applied to all users (or subsets of users based on factors such as gender, age, education, language, geographic location, etc.) to predict user inputs and psychological states. In this case, the actual responses of multiple users are compared to the predicted responses of those users and, if incorrect, those inputs are applied as new training examples to update the global versions of the predictive state-based application models 135. As a result the global versions of the predictive state-based application models 135 provide increasingly accurate prediction results over time for all users (or corresponding subsets of users).

In various implementations, the input prediction module 140 optionally provides the predicted current user psychological state to an application adaptation module 175. The application adaptation module 175 then optionally adapts application states (e.g., increase or decrease an intensity or difficulty of the application, pause the application, change to a different application state, etc.) to influence the user psychological state. For example, if the current user psychological state is predicted to be bored, the application adaptation module 175 may automatically increase the intensity of the application in an attempt to transition the predicted psychological state of the user to a state such as excited, aggressive, cooperative, interested, etc.

Finally, in various implementations, the Predictive Controller applies an optional user matching module 180 to optionally match or join multiple users for shared instances of the application. In various implementations, this matching is performed based on predictions of user psychological states over time. For example, depending on the application, users that frequently exhibit cooperative psychological states may be matched with other users exhibiting cooperative psychological states. However, the point is not necessarily to match users exhibiting the same predicted psychological state. For example, depending on the particular application, application execution for shared application instances may be improved by intentionally matching users exhibiting different predicted psychological states, e.g., matching cooperative users with both aggressive users and excited users, matching fearful users with users predicted to be engaged in deep thought, etc.

2.0 Operational Details of the Predictive Controller:

The above-described program modules are employed for enabling various implementations of the Predictive Controller. As summarized above, the Predictive Controller provides various techniques for predicting the input or response of a particular user to a current state of a particular application prior to receiving actual user inputs so as to reduce latency of application responses to user inputs. The following sections provide a detailed discussion of the operation of various implementations of the Predictive Controller, and of exemplary methods for implementing the program modules and features described in Section 1 with respect to FIG. 1. In particular, the following sections provides examples and operational details of various implementations of the Predictive Controller, including:

An operational overview of the Predictive Controller;
    Exemplary predictive models for joint prediction of user psychological state and corresponding inputs;
    Visible and/or haptic feedback for predicted user inputs;

Adapting applications based on predicted user psychological state;

Matching users for participation in a shared instance of the application; and

Additional customizations and options.

2.1 Operational Overview:

As mentioned above, the Predictive Controller provides various techniques for predicting the input or response of a particular user to a current state of a particular application prior to receiving actual user inputs so as to reduce latency of application responses to user inputs. For example, the user typically reacts to a particular application state or scenario by providing inputs via a hardware controller device. Any particular user input to the application can be considered as a single instance. However, that single input instance is probabilistically dependent on one or more prior application inputs during the user's progression through the various states of the application and on the user's current psychological state or behavior.

Therefore, the user's prior inputs and predicted psychological state can be applied to a predictive model to predict the user's likely next input and current psychological state prior to the user actually making a current input to the application. Consequently, providing such predictions to the application enables the application to begin preparing a response to the predicted input before the user has actually made that input. As such, the application then appears to the user as if it were responding in near real-time to the actual user input, even in cases where inherent system delay from communications between the hardware controller and the application would otherwise result in a noticeable lag or latency.

2.2 Exemplary Predictive Models:

In general, user inputs to an application typically comprises actual hardware controller inputs (including individual inputs and sequences and combinations of multiple inputs) in response to a current application state. As such, application inputs from large numbers of users in response to one or more locally or remotely hosted instances of a particular application (or similar applications) can be anonymously recorded, mapped to corresponding application states, and applied as training data for use by a machine-learning process.

For example, in various implementations, the training data is classified or clustered into various categories associated with or indicative of users' psychological states. Examples of possible psychological states include, but are not limited to, aggressive, passive, cooperative, deep thought, happy, fearful, bored, interested, etc. In various implementations, these psychological states may be hand curated from the training data or may be automatically inferred from the training data by applying any of a variety of statistical or probabilistic modeling techniques to the training data. Further, in various implementations, the training data may be collected from instrumented users during explicit training sessions where parameters including, but not limited to, user heart rate, galvanic skin response, respiration rate, pupil dilation, blink rate, eye gaze direction, etc., are recorded and mapped to corresponding user inputs to the application. These parameters can then be applied to segment the training data of multiple users into sets of likely psychological states. Regardless of how the training data is classified or clustered, the resulting sets of user inputs are then provided as input to a variety of machine-learning processes for use in constructing predictive models that jointly predict current user psychological state (and transitions between psychological states) and the likely next user input to particular application states.

Further, in various implementations, training data is segmented into sets or subsets corresponding to groups of users based on common characteristics of those users. For example, these common characteristics include, but are not limited to, gender, age, education, language, geographic location, etc. Predictive models specific to particular groups are then constructed using only data from the corresponding group to train those models. As such, these group-based models tend to be more relevant and accurate when predicting user inputs and psychological states for the particular groups to which they are directed.

For purposes of explanation, the following discussion provides examples of various implementations for applying a Hidden Markov Model (HMM) to train the predictive models used by the Predictive Controller. However, it should be understood that the Predictive Controller is not intended to be limited to the use of an HMM, and that any other statistical, predictive, or machine-learning based technique may be adapted to train the Predictive Controller for joint prediction of user inputs and current psychological state in response to a current application state. Additional examples of statistical, predictive, or machine-learning techniques that are applicable for use in training models for use by the Predictive Controller include, but are not limited to, Conditional Markov Models (CMM), maximum entropy Markov models (MEMM), conditional random fields (CRF), Semi-Markov CRFs, Markov modulated processes (e.g., Markov modulated Poisson Process (MMPP), Markov-Poisson cascade (MPC), etc.), Bayesian networks, neural networks, or any other deep-learning or machine-learning based modeling techniques.

For example, in the case of an HMM-based predictive model, the HMM can be based on an observable Markov chain (e.g., transitions between actual user inputs via the hardware controller) and one or more unobservable Markov chains (e.g., transitions between predicted psychological states of the user). In this scenario, large sets of existing user hardware controller data and its interaction with the application environment (e.g., application states) is mapped to each application state using anonymous user data and used for training the HMM. For example, consider a simple case with only two psychological states (e.g., aggressive and passive). In this example, the user may be in an aggressive psychological state or a passive psychological state at any particular time while interacting with a particular application. Moreover, throughout execution of the application, the psychological state of the user may transition from being aggressive to passive or vice versa multiple times. Typically, the user's psychological state tends to heavily influence how user is interacting with the application via the hardware controller.

For example, consider an observable Markov chain of a user in an aggressive state (unobservable), may include observations of the user rapidly moving a pointing device from left to right while repeatedly pressing particular controller buttons to effect a particular input to the current state of the application. Conversely, the observable Markov chain of that same user interacting with the same application state while in a passive psychological state (unobservable) may include observations of the user slowly move the pointing device while occasionally pressing one or more controller buttons. These two observable Markov chains are from same user during the same application state will typically result in significantly different responses by the application.

However, the use of the trained HMM-based predictive model enables the Predictive Controller to jointly predict user psychological states and corresponding user inputs throughout execution of the application. As the computing industry increasingly moves from locally hosted applications to cloud-based applications, the ability to accurately predict and respond to user inputs before the user has made those inputs negates some or all of the latency cost associated with real-time applications that are cloud-based or otherwise remotely hosted. As such, from the user perspective, the Predictive Controller enables real-time remote or cloud-based applications to approach or equal the responsiveness and performance of locally hosted applications.

For example, the Predictive Controller considers user behaviors and inputs to enable applications residing on remote servers to predict the user's next input and to update the application response on the server side in advance of receiving the actual user input. On user's side, the output and responsiveness of the application is roughly equivalent to the performance of a locally hosted instance of that application. Further, in various implementations, throughout the application session the Predictive Controller optionally continues to update or adapt the predictive model based on the combination of the user's actual inputs and the corresponding predicted inputs. For example, in various implementations, the Predictive Controller applies maximum likelihood type merit functions to bound the errors associated with incorrect predictions and corresponding application responses. In a fast paced real-time application scenario, relatively larger prediction errors can be allowed as users would are typically not able to distinguish between their input and application response. For example, in a fast paced simulation application, the user would not typically be capable of distinguishing between 5 or 6 very rapid identical successive inputs.

Figure 2:
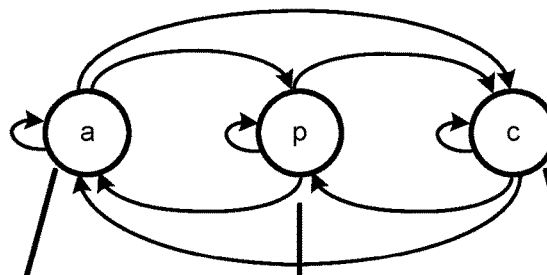
FIG. 2 illustrates an exemplary Hidden Markov Model (HMM) for joint prediction of user psychological state and user inputs or responses to an application state during application execution.
Figure 2:
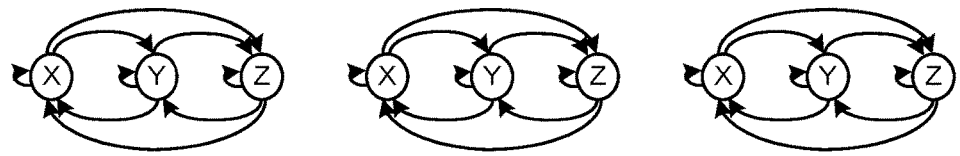

A simple example of an HMM for jointly predicting user psychological states and next user inputs is described below with respect to FIG. 2. In this example of an HMM-based predictive application model of a particular application state, an unobservable Markov chain 200 is shown with psychological states a, p and c (e.g., user psychological states as aggressive, passive and cooperative. Transitions between these psychological states are represented by the curved arrows, each of which has an associated probability (not shown). Further, an observable Markov chain 210 is shown with states X, Y, and Z, each of which represents a specific hardware controller input. Transitions between these controller inputs are represented by the curved arrows, each of which has an associated probability (not shown).

In this example, when user is predicted to be in an aggressive state (e.g., psychological state "a", the probabilities associated with particular controller inputs are different than when the user is predicted to be in a passive psychological state (e.g., state "p"). Further, during any particular application session, the user may transition from one psychological state to another depending upon his/her state of mind, thereby changing the probability of particular inputs for the same application state. Hence there is a transition probability associated with underlying state change. As such, the Predictive Controller applies such models to predict the user's most likely input based on the current states of both the unobservable Markov chain and the observable Markov chain of the HMM. By providing the most likely predicted input to the application, thus enabling the application to begin responding to the user input prior to receipt of the actual user input, the end user experiences reduced latency.

In various implementations, predictive performance of the Predictive Controller is further enhanced by providing a set or series of multiple alternate Markov chains to reduce erroneous application inputs and executions based on predictions that differ from the actual user input. In such cases, the Predictive Controller continuously monitors prediction performance, and if actual user inputs begin to deviate from the predicted responses returned either of the Markov chains of the HMM, the Predictive Controller can shift to use of one of the alternate Markov chains for use by the HMM. In addition, the Predictive Controller can also update the HMM-based predictive model in the case the predictive errors are observed.

2.2.1 Updating the Predictive Models on a Per-User Basis:

Given a trained predictive model, such as an HMM or other model, the Predictive Controller jointly predicts user psychological state and likely next input in response to a certain trigger in the application environment (e.g., the current application state). The Application then uses these predictions to respond with reduced latency. However, if there is an error in the prediction relative to the actual user input, a newer or more refined HMM model is chosen by the Predictive Controller before the next input from the user. As a result, error rates of predicted inputs are reduced in near real-time, thus making such errors almost invisible to the user, depending on the particular application state.

For example, in various implementations, in cases where the predicted next user input does not match the subsequent actual user input, the Predictive Controller optionally updates the corresponding predictive model to more closely match the actual user responses and inputs. By performing the updates on an instance of the predictive model dedicated to a particular user, over time, the model becomes increasing adapted to the user. As such, the model becomes increasingly accurate over time as the model is updated in response to prediction errors. For example, if the user performs a sequence of inputs that are not initially predicted by the model, then, assuming a similar predicted psychological state, that sequence of inputs is more likely to be predicted in similar application states in the future.

In further implementations, the Predictive Controller continues collecting real-world user input over time for further refinement of the predictive models. In other words, the predictive models are continuously updated and refined over time as more input data from multiple users becomes available. Further, the predictive models may be updated by adding or deleting one or more psychological states from the model based on individual user or the larger community of users.

2.3 Visible and/or Haptic Feedback for Predicted Inputs:

As mentioned previously, in various implementations, the Predictive Controller provides tangible feedback (e.g., visual or haptic feedback) in response to the prediction of the next user input to the application. In various implementations, the user is provided with a user interface or the like to either enable or disable this tangible feedback, and to set various options of the tangible feedback (e.g., whether to user visual or haptic feedback, whether that feedback is to be provided via the hardware controller or via one or more video output devices, etc.). In general, this tangible feedback is initiated whenever the predicted next user input is applied to the application. However, in various implementation, this tangible feedback is initiated whenever the predicted next user input differs from a corresponding actual user input that is received subsequent to applying the predicted next user input to the application.

In still further implementations, the Predictive Controller acts in a user assist or training mode wherein tangible feedback is provided in a way that alerts the user to an acceptable input, a typical input, or a correct input that is predicted to be performed in response to a particular application state. In this case, these predicted inputs are referred to as an assistive prediction. In various implementations, these types of assistive predictions are applied for various uses that increase user efficiency. Such uses include, but are not limited to, helping a user to complete or respond to a particular application or application state, helping train the user as to responses that are likely to be performed by other users for particular application states, etc. In such implementations, the Predictive Controller can either apply the assistive prediction directly to the application in conjunction with the tangible feedback to the user, or the Predictive Controller can wait for the user's actual input following the tangible feedback relating the assistive prediction.

In various implementations relating to the user assist or training mode of the Predictive Controller, the Predictive Controller waits to apply the predicted next user input to the application while also waiting to initiate the tangible feedback until either receiving an explicit user request for assistance or a user delay exceeding some predetermined time in responding to the current application state. In such circumstances, the Predictive Controller either concurrently applies the predicted next user input to the application as the current input while also alerting the user to that input, or simply continues to wait for the actual user input following the tangible feedback.

In general, regardless of the purpose for the tangible feedback, this feedback is provided via either or both the hardware controller and/or one or more video output devices (e.g., 2D and 3D display devices such as monitors, televisions, projectors, augmented reality display devices, virtual reality display devices, etc.). The types of tangible feedback enabled by the Predictive Controller include, but are not limited to, visual or haptic feedback, or any combination of both visual and haptic feedback. This feedback generally indicates or alerts the user to a particular hardware controller button or sequence of control inputs corresponding to the predicted next user input (or to the assistive prediction).

Examples of visual alerts include, but are not limited to, illuminating one or more corresponding controller buttons or the like, rendering an animation (e.g., text, icons, digital avatars or characters, etc.), any of which may be displayed with or without an audio component (e.g., speech, tone, music, alarm, etc.), on one or more of the video output devices, etc. Examples of haptic feedback (also referred to herein as tactile feedback or tactile responses) include, but are not limited to applying a force-feedback mechanism to move one or more particular controller buttons or the entire controller, heating or cooling one or more particular controller buttons or the like via a thermoelectric Peltier device or the like, a mild electrical stimulation from one or more particular controller buttons or the like, etc.

2.4 Adapting Applications Based on Predicted Psychological State:

In various implementations, the Predictive Controller provides the current predicted psychological state to the application for use in modifying application responses or states. For example, if the predicted user psychological state is bored, the application can use this prediction to increase an action level of the application so as cause the user to transition to a different psychological state, such as for example, excited, happy, aggressive, interested, etc. In other words, in various implementations, the Predictive Controller optionally adapts application states (e.g., increase or decrease an intensity or difficulty of the application, pause the application, change to a different application state, etc.) to influence the user psychological state.

2.5 Matching Users Based on Predicted Psychological States:

In various implementations, the Predictive Controller optionally matches multiple users for participation in a shared instance of the application based on matching or complementary predicted psychological states of the users being matched. Similarly, in related implementations, this matching is performed based on similar transitions between the predicted psychological states of each user. Further, in various implementations, the Predictive Controller maintains a user profile or the like relating to predicted user psychological state transitions during prior instances of application execution and interaction. The Predictive Controller then applies these user profiles to match multiple compatible users for participation in a shared instance of any of a variety of applications. For example, if a particular user tends to remain in an aggressive psychological state during a majority of application interactions, the Predictive Controller can apply a matchmaking algorithm to similar users for participation in shared instances of other applications, thereby providing a more relevant and interesting application experience for those users.

In other words, in various implementations, the Predictive Controller matches users based on predictions of user psychological states over time. For example, depending on the application, users that frequently exhibit cooperative psychological states may be matched with other users exhibiting cooperative psychological states. However, the point is not necessarily to match users exhibiting the same predicted psychological state, but to match users so as to enhance the experience of all of the matched users. For example, depending on the particular application, application execution and user experience may be improved by intentionally matching users exhibiting different predicted psychological states, e.g., matching cooperative users with both aggressive users and excited users, matching fearful users with users predicted to be engaged in deep thought, etc.

2.6 Additional Customizations and Options:

In various implementations, the Predictive Controller runs two or more alternate predictive models can be run in parallel to predict user inputs or responses. Then, the application may begin preparing alternate responses to the predicted user input (e.g., rendering an application scene, etc.), based on the prediction from each of the alternate models. Then, in response to the actual user input, the application can immediately output the correct response to the actual user input without needing to further evaluate that input and render the appropriate application state. In other words, the application can avoid committing to a particular response until the last possible instant by applying two or more of the highest probability predicted inputs to pre-generate alternate responses, and then providing the actual response to the user based on the user's actual input that matches one of the predicted responses.

Figure 3:
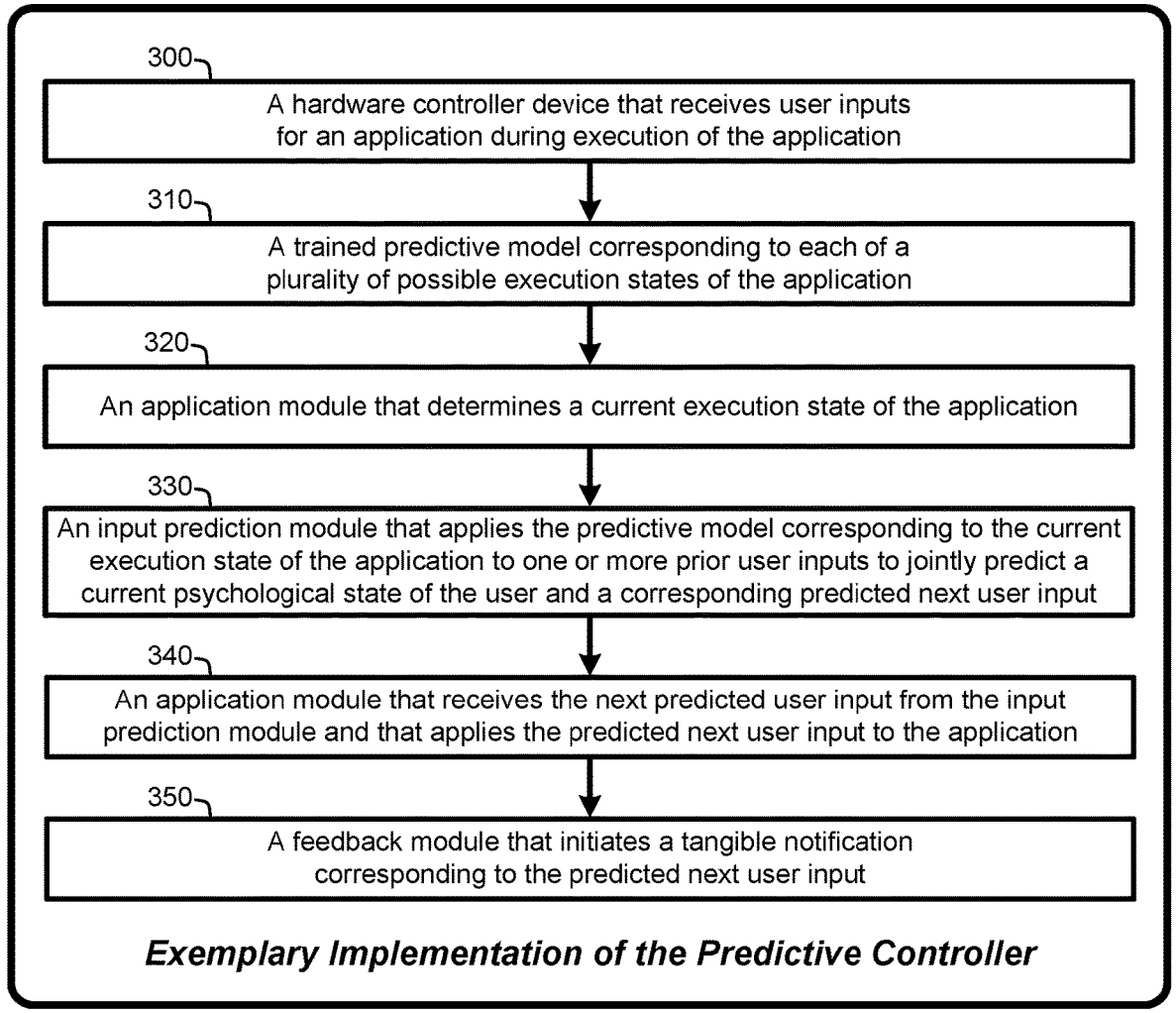
FIG. 3 illustrates an exemplary process for implementing the Predictive Controller.
Figure 4:
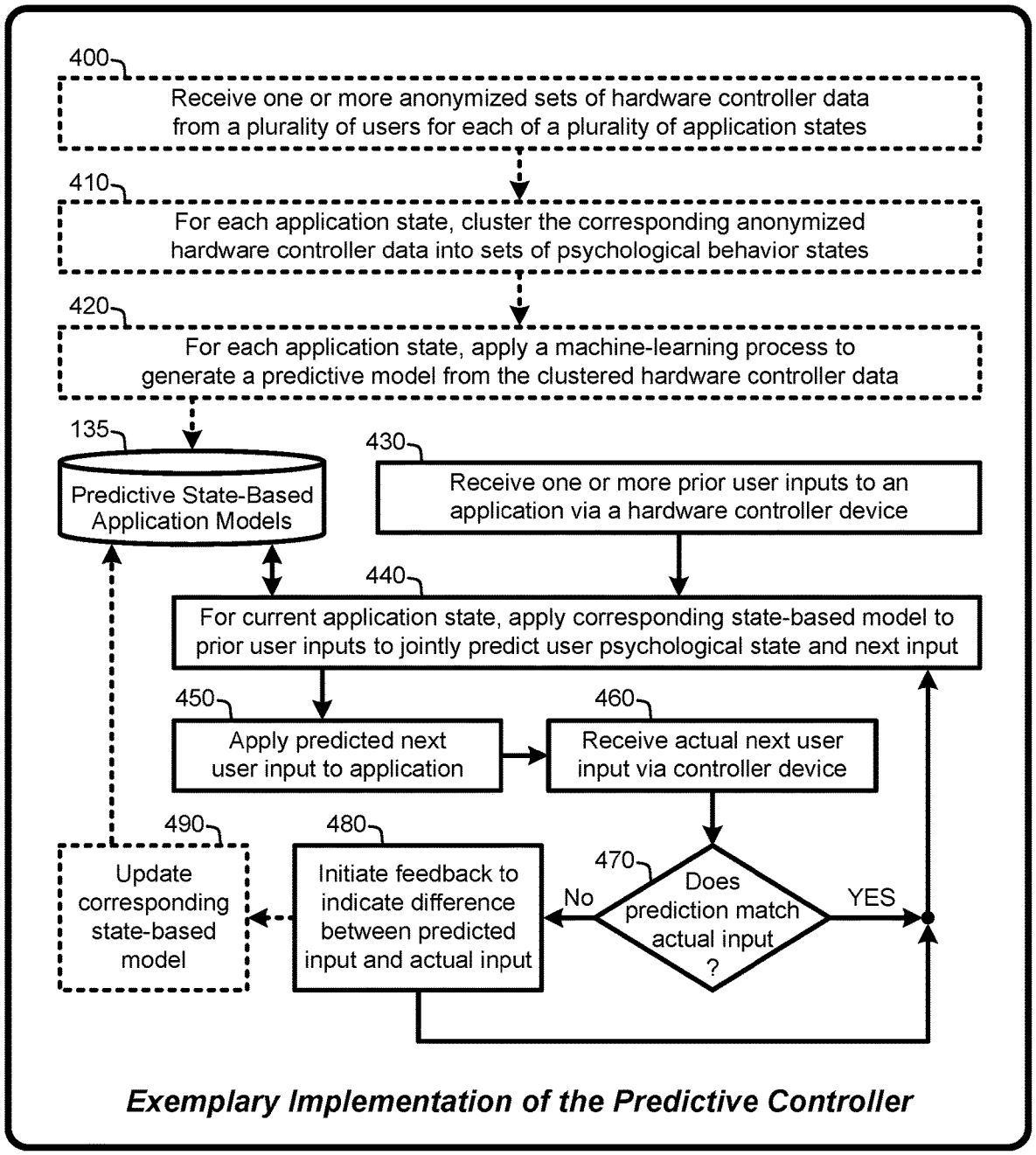
FIG. 4 illustrates an exemplary process for implementing the Predictive Controller.
Figure 5:
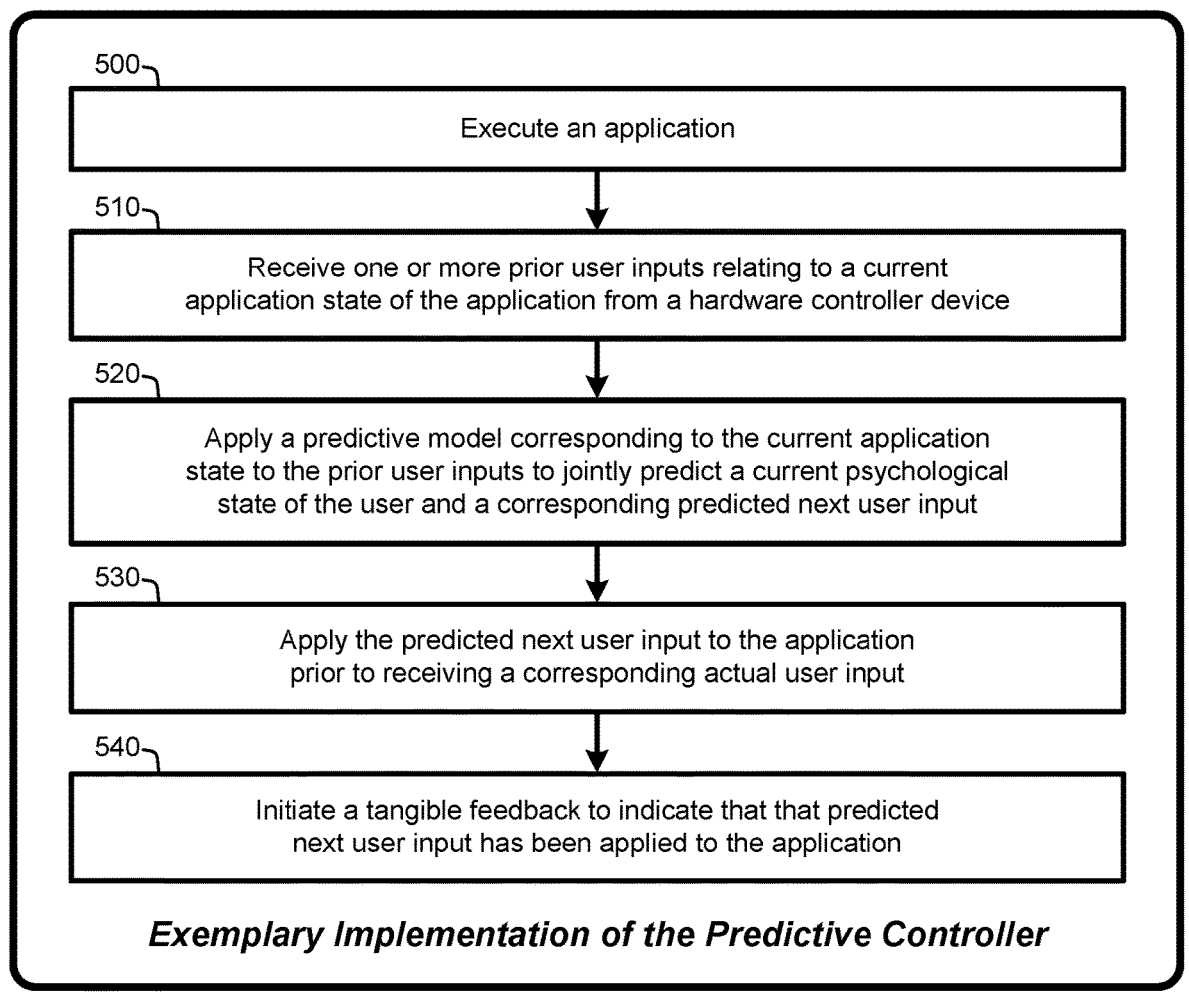
FIG. 5 illustrates an exemplary process for implementing the Predictive Controller.

3.0 Operational Summary of the Predictive Controller:

The processes described above with respect to FIG. 1 and FIG. 2, and in further view of the detailed description provided above in Sections 1 and 2, are illustrated by the general operational flow diagrams of FIG. 3 through FIG. 5. In particular, FIG. 3 through FIG. 5 provide exemplary operational flow diagrams that summarize the operation of some of the various implementations of the Predictive Controller. FIG. 3 through FIG. 5 are not intended to provide an exhaustive representation of all of the various implementations of the Predictive Controller described herein, and the implementations represented in these figures are provided only for purposes of explanation.

Further, any boxes and interconnections between boxes that may be represented by broken or dashed lines in FIG. 3 through FIG. 5 represent optional or alternate implementations of the Predictive Controller described herein, and that any or all of these optional or alternate implementations, as described below, may be used in combination with other alternate implementations that are described throughout this document.

In general, as illustrated by FIG. 3, in various implementations, the Predictive Controller includes a hardware controller device (300) that receives user inputs for an application during execution of the application. The Predictive Controller further includes a trained predictive model (310) corresponding to each of a plurality of possible execution states of the application. In addition, the Predictive Controller further includes an application module (320) that determines a current execution state of the application. The Predictive Controller further includes an input prediction module (330) that applies the predictive model corresponding to the current execution state of the application to one or more prior user inputs to jointly predict a current psychological state of the user and a corresponding predicted next user input. The Predictive Controller also includes an application module (340) that receives the next predicted user input from the input prediction module and that applies the predicted next user input to the application. Finally, the Predictive Controller includes a feedback module (350) that initiates a tangible notification corresponding to the predicted next user input.

In general, as illustrated by FIG. 4, in various implementations, the Predictive Controller begins operation by receiving (430) one or more prior user inputs to an application via a hardware controller device. Next, for a current application state, the Predictive Controller applies a corresponding predictive state-based application model (135) to the prior user inputs to jointly predict (440) a user psychological state and a next input. The Predictive Controller then applies (450) the predicted next user input to the application. The Predictive Controller then receives (460) the actual next user input via the controller device. Following receipt of the actual next user input, the Predictive Controller initiating a tactile or haptic feedback (480) via the hardware controller device to indicate any difference (470) between predicted next user input and actual next user input. As illustrated, the Predictive Controller can then iterate the prediction process by treating the actual user input (see step 460) as the most recent prior input for jointly predicting (440) a new user psychological state and a new next input.

Further, as also illustrated by FIG. 4, in various implementations, the model training process begins by receiving (400) one or more anonymized sets of hardware controller data from a plurality of users for each of a plurality of application states. Then, for each application state, the Predictive Controller clusters (410) or otherwise groups the corresponding anonymized hardware controller data into sets of psychological behavior states. For each application state, the Predictive Controller then applies (420) a machine-learning process to generate the predictive state-based application models (135) from the clustered hardware controller data.

In addition, in various implementations, the Predictive Controller performs an error checking and model update process by when the prediction is determined (470) to be in error (i.e., the input prediction does not match the actual user input). If the prediction is in error, the Predictive Controller applies various machine-learning techniques to update (490) the corresponding predictive state-based application model (135).

In general, as illustrated by FIG. 5, in various implementations, the Predictive Controller begins operation by executing (500) an application (e.g., locally or remotely hosted). The Predictive Controller then continues by receiving (510) one or more prior user inputs relating to a current application state of the application from a hardware controller device. The Predictive Controller then applies (520) a predictive model corresponding to the current application state to the prior user inputs to jointly predict a current psychological state of the user and a corresponding predicted next user input. The Predictive Controller then applies (530) the predicted next user input to the application prior to receiving a corresponding actual user input. Finally, the Predictive Controller initiates a tangible feedback (540) to indicate that that predicted next user input has been applied to the application.

4.0 Exemplary Implementations of the Predictive Controller:

The following paragraphs summarize various examples of implementations that may be claimed in the present document. The implementations summarized below are not intended to limit the subject matter that may be claimed in view of the detailed description of the Predictive Controller. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the Predictive Controller operates with any type of hardware controller or user input device to predict the input or response of a particular user to a current state (e.g., a particular scene, set of circumstances, development, etc.) of a particular application that is either locally or remotely hosted for execution and then rendered, transmitted if remote, and displayed on one or more local display devices. In other words, whether the application is executed either locally or remotely, current application states are rendered, transmitted if remote, and then displayed on one or more display devices local to the user while the user interacts with those application states via a local hardware controller or other input device in communication with the application. When predicting user inputs, the Predictive Controller first determines the current execution state of the application. In various implementations, the Predictive Controller then applies a predictive model corresponding to the current execution state of the application to one or more prior user inputs to jointly predict a current psychological state of the user and a corresponding predicted next user input or response. In various implementations, the Predictive Controller then applies the predicted next user input or response to the application prior to receiving the actual user input or response. As a result, the Predictive Controller reduces latency of both locally and remotely hosted applications when responding to user inputs, regardless of the controller type being used to receive user inputs or responses. In various implementations, the Predictive Controller also initiates a tangible feedback or notification (e.g., visible or haptic feedback) corresponding to the predicted next user input whenever that predicted next user input is applied to the application or whenever that predicted next user input differs from the subsequently received actual user input.

As a first example, in various implementations, a dynamic Predictive Controller is implemented via means, processes or techniques for providing a hardware controller device that receives user inputs for an application during execution of the application. The Predictive Controller also includes a trained predictive model corresponding to each of a plurality of possible execution states of the application. In addition, the Predictive Controller includes an application module that determines a current execution state of the application. The Predictive Controller further includes an input prediction module that applies the predictive model corresponding to the current execution state of the application to one or more prior user inputs to jointly predict a current psychological state of the user and a corresponding predicted next user input. An application module then receives the next predicted user input from the input prediction module and that applies the predicted next user input to the application. Finally, a feedback module initiates a tangible notification corresponding to the predicted next user input.

As a second example, in various implementations, the first example is further modified via means, processes or techniques for providing a model update module that compares the predicted next user input to a corresponding actual user input received from the hardware controller device subsequent to applying the predicted next user input to the application, and if the predicted next user input does not match the actual user input, updates the corresponding predictive model based on the actual user input.

As a third example, in various implementations, any of the first example and the second example are further modified via means, processes or techniques for providing a user matching module that matches a plurality of users for participation in a shared instance of the application based on the predicted psychological state of each user.

As a fourth example, in various implementations, any of the first example, the second example and the third example are further modified via means, processes or techniques for providing a model training module that applies a machine-learning process to train each predictive model from anonymized user inputs of a plurality of users received during each possible execution state of the application, and categorizes the anonymized user inputs into a plurality of possible psychological states for each corresponding execution state of the application.

As a fifth example, in various implementations, any of the first example, the second example, the third example and the fourth example are further modified via means, processes or techniques wherein the trained predictive model corresponding to each of the plurality of possible execution states of the application further comprises a Hidden Markov Model (HMM) adapted to jointly transition between a prediction of the possible psychological states and to predict the corresponding next user input as an ongoing process throughput execution of the application.

As a sixth example, in various implementations, any of the first example, the second example, the third example, the fourth example, and the fifth example are further modified via means, processes or techniques for providing an application adaptation module that automatically adapts application execution to influence the predicted current psychological state of the user.

As a seventh example, in various implementations, any of the first example, the second example, the third example, the fourth example, the fifth example, and the sixth example are further modified via means, processes or techniques wherein the tangible notification further comprises causing the hardware controller to generate a physically tactile response in a sequence of one or more controller buttons representing the predicted next user input.

As an eighth example, in various implementations, any of the first example, the second example, the third example, the fourth example, the fifth example, the sixth example and the seventh example are further modified via means, processes or techniques wherein the tangible notification further comprises rendering a visible alert representing the predicted next user input on one or more video output devices on which the application is being rendered.

As a ninth example, in various implementations, a Predictive Controller is implemented via means, processes or techniques for receiving one or more prior user inputs to an application via a hardware controller device. For a current application state, the Predictive Controller then applies a corresponding predictive state-based application model to the prior user inputs to jointly predict a current user psychological state and a next user input. The Predictive Controller then applies the predicted next user input to the application prior to receipt of an actual next user input. Finally, following receipt of the actual next user input, the Predictive Controller initiates a tactile feedback via the hardware controller device to indicate any difference between predicted next user input and actual next user input.

As a tenth example, in various implementations, the ninth example is further modified via means, processes or techniques for comparing the predicted next user input to actual next user input and, in the event that the prediction does not match the actual input, updating the corresponding predictive state-based application model.

As an eleventh example, in various implementations, any of the ninth example and the tenth example are further modified via means, processes or techniques for receiving one or more anonymized sets of hardware controller data from a plurality of users for each of a plurality of application states, and for each application state, clustering the corresponding anonymized hardware controller data into sets of psychological behavior states, and for each application state, applying a machine-learning process to generate the corresponding predictive state-based application model.

As a twelfth example, in various implementations, any of the ninth example, the tenth example and the eleventh example are further modified via means, processes or techniques for matching a plurality of users for participation in a shared instance of the application based on the predicted psychological state of each user.

As a thirteenth example, in various implementations, any of the ninth example, the tenth example, the eleventh example and the twelfth example are further modified via means, processes or techniques wherein the predictive state-based application model corresponding to the current application state further comprises a Hidden Markov Model (HMM) adapted to jointly transition between a prediction of possible user psychological states and to predict the corresponding next user input as an ongoing process throughput execution of the application.

As a fourteenth example, in various implementations, any of the ninth example, the tenth example, the eleventh example, the twelfth example and the thirteenth example are further modified via means, processes or techniques for automatically adapting application execution to influence the predicted current user psychological state.

As a fifteenth example, in various implementations, any of the ninth example, the tenth example, the eleventh example, the twelfth example, the thirteenth example, and the fourteenth example are further modified via means, processes or techniques for rendering a visible alert representing the predicted next user input on one or more display devices on which the application is being rendered.

As a sixteenth example, in various implementations, a Predictive Controller is implemented via means, processes or techniques for causing a computing device to execute a method for predicting user inputs. This method begins by executing an application. In addition, the Predictive Controller receives one or more prior user inputs relating to a current application state of the application from a hardware controller device. Further, the Predictive Controller applies a predictive model corresponding to the current application state to the prior user inputs to jointly predict a current psychological state of the user and a corresponding predicted next user input. Next, the Predictive Controller applies the predicted next user input to the application prior to receiving a corresponding actual user input. Finally, the Predictive Controller initiates a tangible feedback to indicate that that predicted next user input has been applied to the application.

As a seventeenth example, in various implementations, the sixteenth example is further modified via means, processes or techniques for comparing the predicted next user input to the corresponding actual user input, and if the predicted next user input does not match the actual user input, updating the corresponding predictive model based on the actual user input.

As an eighteenth example, in various implementations, any of the sixteenth example and the seventeenth example are further modified via means, processes or techniques for matching a plurality of users for participation in a shared instance of the application based on the predicted psychological state of each user.

As a nineteenth example, in various implementations, any of the sixteenth example, the seventeenth example and the eighteenth example are further modified via means, processes or techniques for automatically adapting application execution to influence the predicted current psychological state of the user.

As a twentieth example, in various implementations, any of the sixteenth example, the seventeenth example, the eighteenth example and the nineteenth example, are further modified via means, processes or techniques wherein the trained predictive model comprises a Hidden Markov Model (HMM) adapted to jointly transition between a prediction of possible psychological states and to predict the corresponding next user input as an ongoing process throughput execution of the application.

Figure 6:
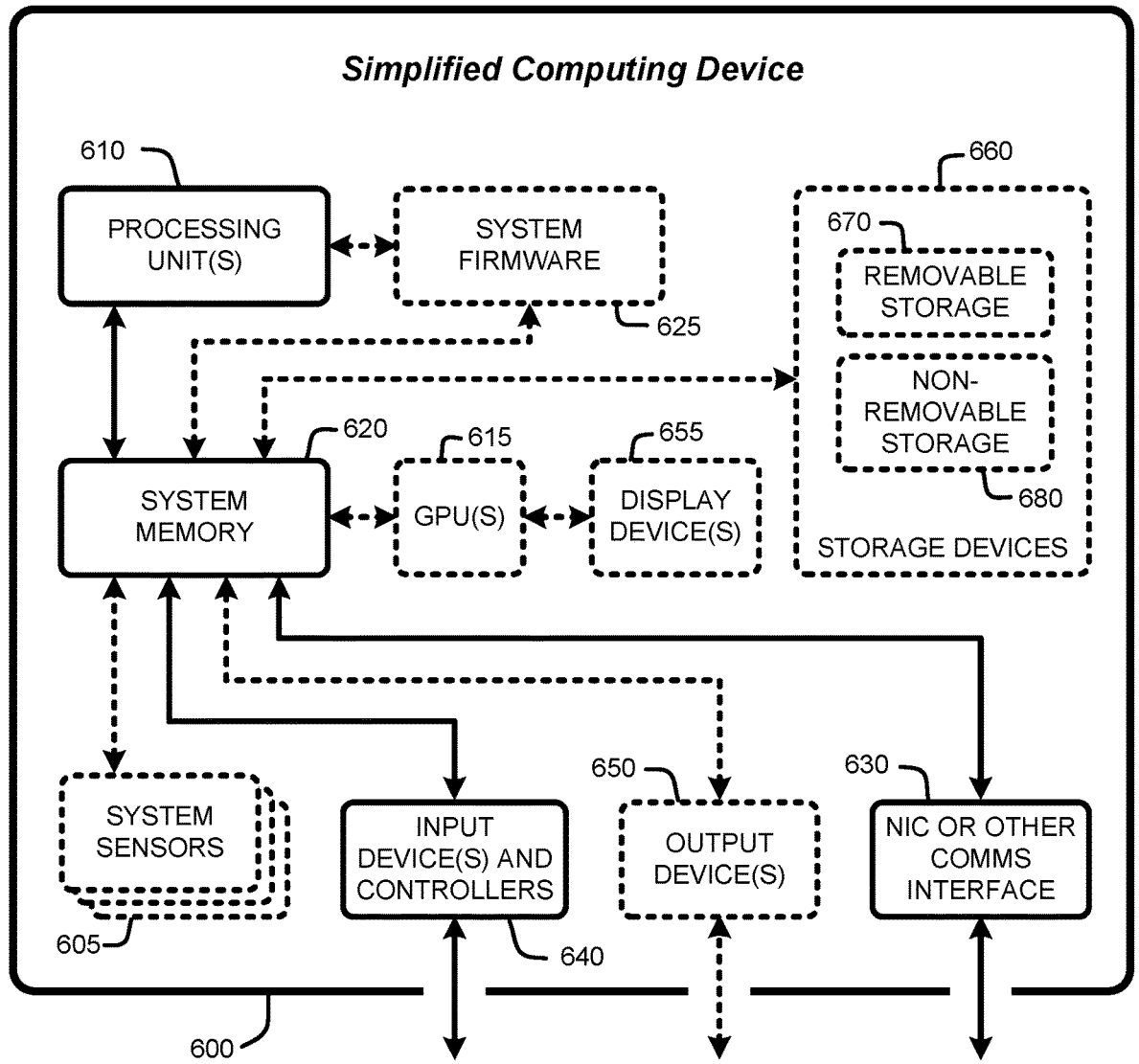
FIG. 6 is a general system diagram depicting a simplified general-purpose computing device having simplified computing and I/O capabilities for use in effecting various implementations of the Predictive Controller, as described herein.

5.0 Exemplary Operating Environments:

The Predictive Controller implementations described herein are operational within numerous types of general purpose or special purpose computing system environments or configurations. FIG. 6 illustrates a simplified example of a general-purpose computer system on which various implementations and elements of the Predictive Controller, as described herein, may be implemented. Any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Predictive Controller implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. The processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a network interface controller (NIC) 630 or other network communications interface. The simplified computing device 600 may also include one or more computer input devices 640 or hardware controllers, including, but not limited to handheld controllers, mice or other pointing devices, gesture tracking devices, eye-tracking devices, body tracking devices, user held or worn inertial sensors and input devices, user worn electromyography (EMG) based controllers, touchscreens, touch-sensitive surfaces, keyboards, audio input devices, voice or speech-based input and control devices, video input devices, haptic input devices, devices for receiving wired or wireless data transmissions, or any combination of such devices.

Similarly, various interactions with the simplified computing device 600 and with any other component or feature of the Predictive Controller, including input, output, control, feedback, and response to one or more users or other devices or systems associated with the Predictive Controller, are enabled by a variety of Natural User Interface (NUI) scenarios. The NUI techniques and scenarios enabled by the Predictive Controller include, but are not limited to, interface technologies that allow one or more users user to interact with the Predictive Controller in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 640 or system sensors 605. Such NUI implementations are also enabled by the use of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Predictive Controller.

However, the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Predictive Controller.

The simplified computing device 600 may also include other optional components such as one or more conventional computer output devices 650 (e.g., display device(s) 655, audio output devices, video output devices, devices for transmitting wired or wireless data transmissions, and the like). Typical network interface controllers (NICs) 630 and communications interfaces, input devices 640, output devices 650, and storage devices 660 for general-purpose computers are well known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information or content delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Predictive Controller implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 625, hardware, or any combination thereof to control a computer to implement the disclosed subject matter. The term "article of manufacture" as used herein is intended to encompass a computer program accessible from any computer-readable device, or media.

The Predictive Controller implementations described herein may be further described in the general context of computer-executable instructions, such as program modules, being executed by a computing device. Generally, program modules include routines, programs, objects, components, data structures, and the like, that perform particular tasks or implement particular abstract data types. The Predictive Controller implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Predictive Controller has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Predictive Controller. It is intended that the scope of the Predictive Controller be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Predictive Controller described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process, comprising:
receiving one or more prior user inputs to an application via a hardware controller device;
for a current application state, applying a corresponding predictive state based application model to the prior user inputs to predict a current user psychological state; and
based on the current user psychological state, automatically adapting application execution to influence a user psychological state by matching a first user having the current user psychological state with a second user exhibiting a different predicted user psychological state.

2. The process of claim 1, wherein adapting application execution includes increasing or decreasing difficulty of the application.

3. The process of claim 1, wherein adapting application execution includes changing a speed of the application.

4. The process of claim 1, wherein adapting application execution includes changing to a different application state.

5. The process of claim 1, wherein adapting application execution includes changing an action level of the application.

6. The process of claim 1, wherein adapting application execution includes changing a video rendering of an application scene.

7. The process of claim 1, wherein the predictive state based application model further comprises a Hidden Markov Model (HMM) adapted to jointly transition between a prediction of the possible psychological states and to predict a predicted user psychological state.

8. A system, comprising:
a hardware controller device that receives user inputs for an application during execution of the application;
a trained predictive model corresponding to each of a plurality of possible execution states of the application;
an application module that determines a current execution state of the application; and
a corresponding predictive state based application model to predict a current user psychological state based on user inputs from the hardware controller device that, based on the current user psychological state, automatically adapts application execution state to influence a user psychological state by matching a plurality of users for participation in a shared instance of the application based on a different predicted psychological state of each user.

9. The system of claim 8 further comprising a model training module that:
applies a machine-learning process to train each predictive model from anonymized user inputs of a plurality of users received during each possible execution state of the application; and
categorizes the anonymized user inputs into a plurality of possible psychological states for each corresponding execution state of the application.

10. The system of claim 8, wherein the current psychological states include aggressive, passive, and cooperative.

11. The system of claim 8, wherein the predictive state based application model further comprises a Hidden Markov Model (HMM) adapted to jointly transition between a prediction of the possible psychological states and to predict a predicted user psychological state.

12. The system of claim 8, wherein the predictive state based application model automatically adapts application execution state to influence a user psychological state to increase an interest level in the application.

13. A computer-implemented process, comprising:
receiving one or more prior user inputs to an application via a hardware controller device;
for a current application state, applying a corresponding predictive state based application model to the prior user inputs to predict a current user psychological state and a corresponding predicted next user input;
based on the current user psychological state, automatically adapting application execution to influence a user psychological state by matching a first user having the predicted user psychological state with a second user exhibiting a different user psychological state;
receiving a received next user input; and
comparing the received next user input to the predicted next user input.

14. The process of claim 13, wherein a comparison of the received next user input and the predicted next user input is used to confirm a predicted user state.

15. The process of claim 13, wherein a comparison of the received next user input and the predicted next user input is used to identify a transition between user psychological states.

16. The process of claim 13, wherein the predictive state based application model further comprises a Hidden Markov Model (HMM) adapted to jointly transition between a prediction of the possible psychological states and to predict a predicted user psychological state.

\* \* \* \* \*